United States Patent
Steffi

(10) Patent No.: US 8,677,948 B2
(45) Date of Patent: Mar. 25, 2014

(54) VARIABLE SPEED HIGH EFFICIENCY COOLING SYSTEM

(75) Inventor: Leo T. Steffi, Plymouth, MN (US)

(73) Assignee: Cummins Power Generation IP, Inc., Minneapolis, MN (US)

( * ) Notice: Subject to any disclaimer, the term of this patent is extended or adjusted under 35 U.S.C. 154(b) by 618 days.

(21) Appl. No.: 12/924,806

(22) Filed: Oct. 5, 2010

(65) Prior Publication Data

US 2011/0115235 A1    May 19, 2011

Related U.S. Application Data

(60) Provisional application No. 61/248,849, filed on Oct. 5, 2009.

(51) Int. Cl.
| | |
|---|---|
| *F02B 63/00* | (2006.01) |
| *F01P 7/02* | (2006.01) |
| *F01P 7/04* | (2006.01) |
| *F01P 1/02* | (2006.01) |

(52) U.S. Cl.
USPC ......... 123/2; 123/41.12; 123/41.63; 123/41.7

(58) Field of Classification Search
USPC ...................................................... 123/41.12
See application file for complete search history.

(56) References Cited

U.S. PATENT DOCUMENTS

| | | | |
|---|---|---|---|
| 4,489,680 A | 12/1984 | Spokas et al. | |
| 5,002,019 A | 3/1991 | Klaucke et al. | |
| 5,121,324 A * | 6/1992 | Rini et al. | 701/105 |
| 5,433,175 A * | 7/1995 | Hughes et al. | 123/2 |
| 5,890,460 A * | 4/1999 | Ball et al. | 123/41.7 |
| 6,128,905 A | 10/2000 | Fahlsing | |
| 6,349,882 B1 * | 2/2002 | Kita et al. | 236/34 |
| 6,895,903 B2 | 5/2005 | Campion | |
| 2004/0004356 A1 | 1/2004 | Akimoto et al. | |
| 2005/0179261 A1 | 8/2005 | Hatz et al. | |
| 2008/0053129 A1 | 3/2008 | Follette et al. | |
| 2008/0282999 A1 | 11/2008 | Shumaker | |
| 2009/0095462 A1 | 4/2009 | Ramaswamy | |
| 2009/0228149 A1 * | 9/2009 | Alston | 700/276 |

* cited by examiner

*Primary Examiner* — Lindsay Low
*Assistant Examiner* — Syed O Hasan
(74) *Attorney, Agent, or Firm* — Foley & Lardner LLP

(57) ABSTRACT

The present invention includes an engine mechanically coupled to a generator to provide mechanical power thereto and a housing assembly defining an interior space to at least partially enclose the engine and the generator. The housing has a first airflow path structured to provide cooling into the radiator and a second airflow path structured to provide cooling to at least one of the engine and the generator. A temperature sensor can be disposed within the housing and a variable speed fan can be in flow communication with at least one of the first airflow path and the second airflow path. Further, a controller may be in communication with the variable speed fan and the temperature sensor.

29 Claims, 4 Drawing Sheets

VARIABLE SPEED HIGH EFFICIENCY COOLING SYSTEM

CROSS REFERENCE TO RELATED APPLICATIONS

The present application claims the benefit of U.S. Provisional Patent Application No. 61/248,849 filed on Oct. 5, 2009, and the same is herein incorporated by reference in its entirety.

GOVERNMENT RIGHTS

The present invention was made with U.S. Government assistance under Department of Defense contract Number W15P7T-04-D-A003. The U.S. Government has certain rights in the invention.

BACKGROUND

The present application is directed to unique systems, apparatus, and methods involving an electric power generator driven by an internal combustion engine.

A generator set (genset) typically includes an electric power generator together with an internal combustion engine structured to mechanically drive the generator to produce electricity. Genset implementation varies greatly, including both mobile and stationary applications, primary and standby/backup power, controlled and uncontrolled environments, and the like. In many applications it is desired that the genset operate outdoors, being able to tolerate environmental extremes of temperature, humidity, precipitation, and the like. In most generator set applications a cooling fan is mounted to the engine and runs at a relatively low efficiency. Fan efficiency is low for several reasons, including the air inlet to the fan is partially blocked by the engine resulting in high pressure drops and the fans are required to be small because of packaging constraints resulting in a high fan sped. Furthermore, all cooling air flows through the radiator and engine compartment result in high air volume and high pressure drop which in turn increases the need for higher fan power. Accordingly, there remains an ongoing need for further contributions in this area of technology.

SUMMARY

One embodiment of the present application includes a unique generator set (genset) configuration. Other embodiments include unique genset systems, apparatus, and methods. Further embodiments, inventions, forms, objects, features, advantages, aspects, and benefits of the present application are otherwise set forth or become apparent from the description and drawings included herein.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
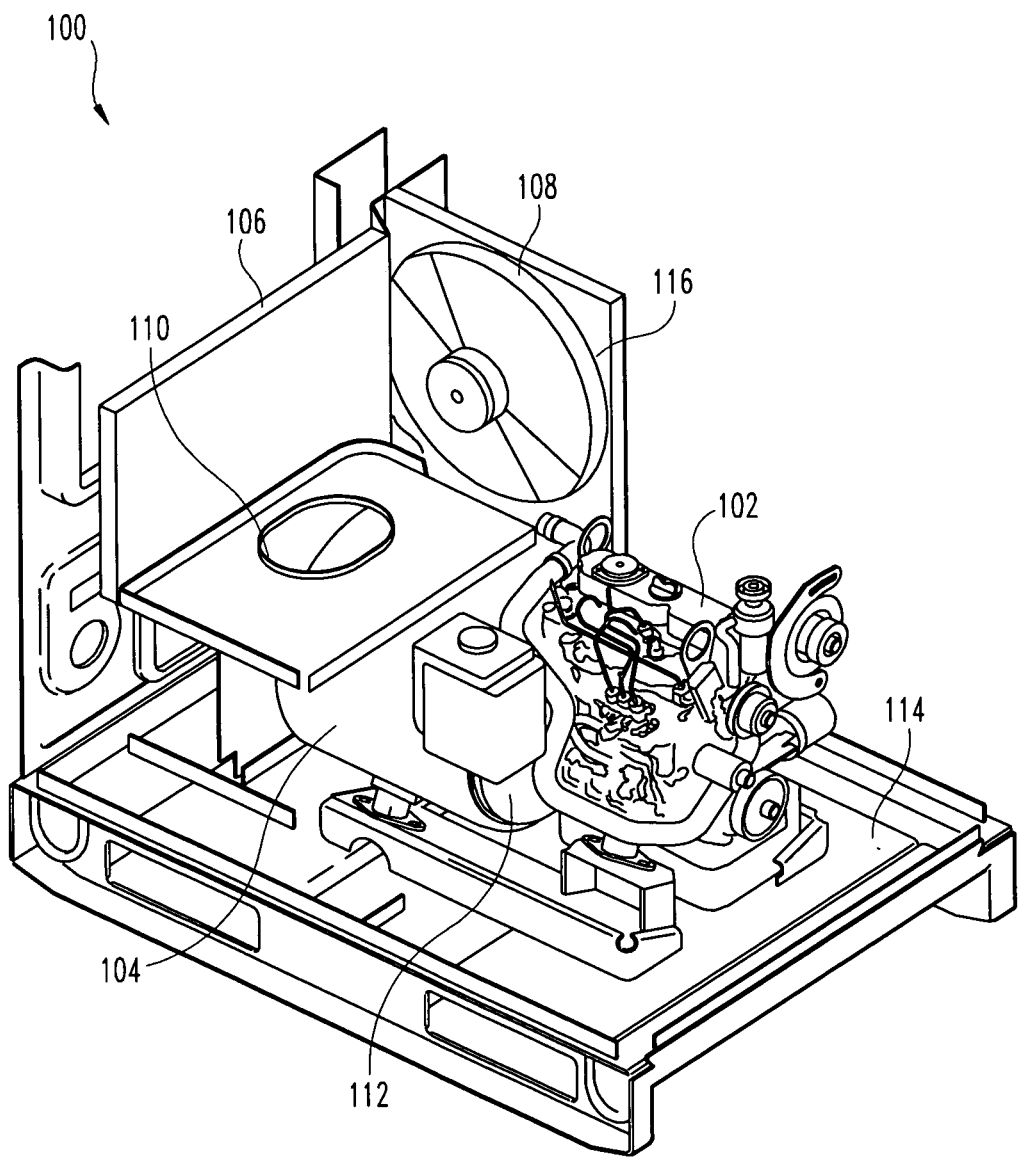
FIG. 1 depicts a cutaway view of a genset.

For purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
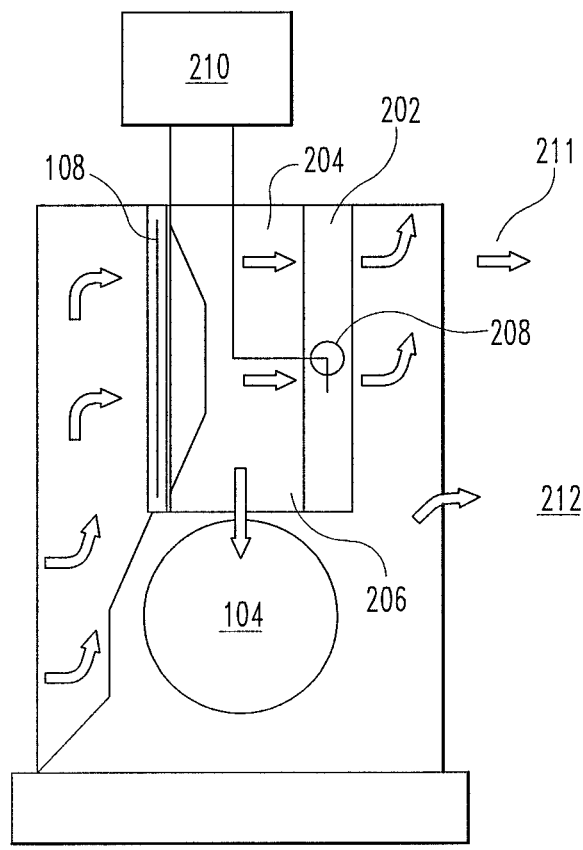
FIG. 2 is a schematic depiction of airflow through a genset.
Figure 3:
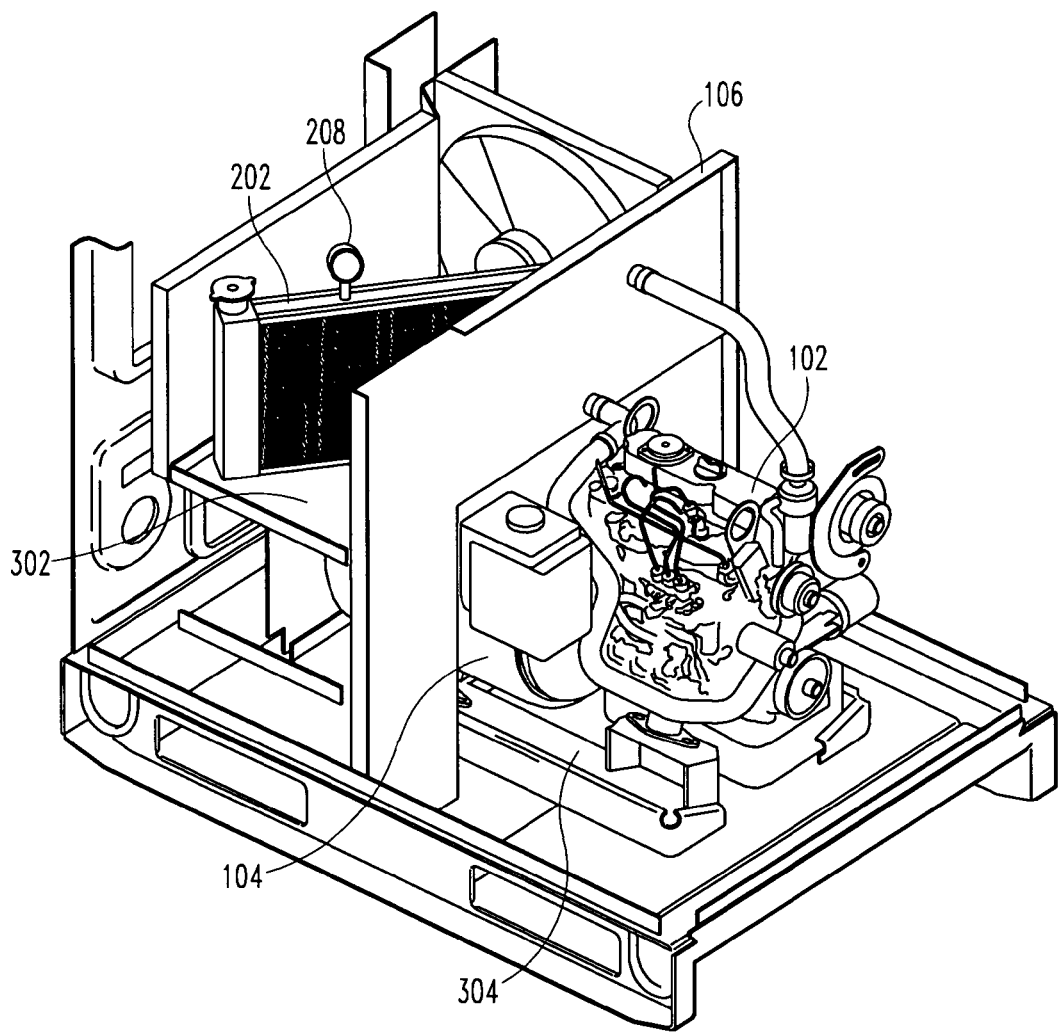
FIG. 3 depicts a cutaway view of a genset including a radiator.
Figure 4:
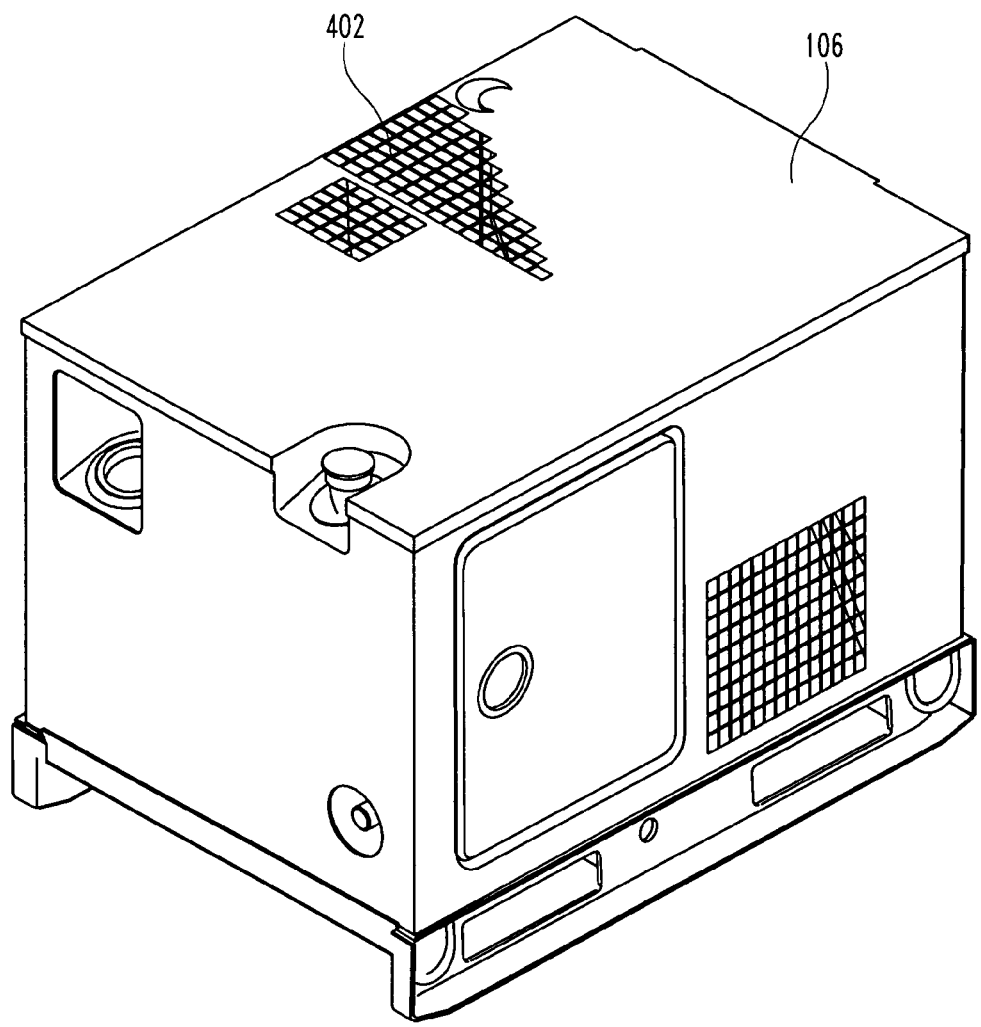
FIG. 4 depicts a view of a genset housing, rotated to show an air inlet and air outlet.

FIGS. 1-4 are various embodiments of apparatuses for cooling a generator set (genset). In one embodiment, the apparatus includes an engine 102 mechanically coupled to a generator 104. A housing assembly 106 includes an interior space 114 which may partially or wholly enclose the engine 102 and the generator 104. The housing 106 provides for a first airflow path 204 and a second airflow path 206. The first airflow path 204 is utilized to provide cooling to the radiator 202. The second airflow path 206 is utilized to provide cooling to the engine 102 and the generator 104. A temperature sensor 208 is located within the housing, providing a signal to a controller 210. The controller 210 can control a variable speed fan 108. The variable speed fan 108 provides for airflow into the first airflow path 204 and the second airflow path 206.

In certain embodiments, the housing 106 contains a first compartment 302 which houses the radiator 202 and a second compartment 304 which may house the engine 102 and the generator 104. The first compartment 302 and second compartment 304 permit cooling flow between them through the use of a passage or aperture 110. The first compartment 302 may have a first outlet 211 to discharge heated air from the housing 106 after the cooling air has been heated from cooling internal components. The second compartment 304 may also contain a second outlet 212 which also discharges heated air from the housing 106. Furthermore, there may be a fan 112 disposed within the housing 106. Fan 112 may be integral to the generator 104 or may be a stand alone unit. In a specific embodiment, there is one air inlet 116 to the housing 106 and a single cooling fan 108 with one air outlet 402.

In another embodiment, an engine 102 may be dedication to the production of electricity by a generator 104. In this embodiment, a housing 106 at least partially encloses the engine 102 and the generator 104. The benefits of various housing configurations are later discussed in great depth. A variable speed cooling fan 108 provides cooling to at least one of the engine 102 and the generator 104. A controller 210 is in communication with the variable speed cooling fan 108 and through the communication, adjusts the speed of the variable speed cooling fan 108.

In a further embodiment, the engine 102 may be in fluid communication with a radiator 202. The variable speed cooling fan 108 may be electrically powered. Should the variable speed cooling fan 108 be electrically powered, it may be in electronic communication with one of a power supply, a battery, or a generator power output (not shown). A temperature sensor 208 may also be disposed within the housing. The temperature sensor 208 is designed to provide feedback to the controller 210. The controller 210 then utilizes this feedback to alter the speed of the variable speed cooling fan 108 to reach a target parameter.

In yet a further embodiment, the housing 106 may comprise a first airflow path 204 may provide cooling air to the radiator 202 and a second airflow path 206 may provide cooling air to the engine 102 and/or the generator 104.

In yet a further embodiment, a plurality of cooling fans may be utilized. Some of the cooling fans may be variable speed cooling fans 108, and others may be single speed cooling fans. A variable speed cooling fan 108 may be a continuously variable speed fan (e.g. the speed of the fan can be set to any point, or any point within a range), may be a fan with multiple speeds (e.g. a fan having a high, medium, and low setting), or may be any other variable speed cooling fan to one of ordinary skill in the art at the time of invention.

In one example, a genset with a single air inlet to the housing, a single cooling fan, and a single air outlet is utilized. This arrangement may be used, for example, in a 5 kW rated form of the Advanced Medium Module Power Sources (AM-MPS) program of the U.S. Department of Defense. Internal to the genset housing, the air draw therein by the fan is separated into two different airflow paths. One path removes heat from the radiator, and the other path removes heat from the generator and the engine compartment. Separate flow paths for radiator cooling air and generator and engine cooling air result in the ability to utilize smaller inlet and outlet air ducts to the engine compartment. The separate flow paths ensure that the engine air intake temperature is warm at light loads and cool at high loads resulting in improved wet stacking performance.

In other embodiments, more than one variable-speed fan may be utilized to provide the desired air flow(s), and for such multiple fan embodiments, all or only some fans may be of a variable-speed type. For instance, the genset may include three variable speed fans arranged to define the air intake. At low temperatures, the variable speed fans do not run until the engine is at recommended operating temperature, and then operate at a target parameter, which ensures desired engine performance. This approach reduces problems such as freezing crankcase ventilation lines and results in increased combustion temperature and improved wet stacking performance. When the fan is not running, the alternator fan, generator fan, or stand-alone fan unit circulates air inside the housing without air flowing through the radiator. This keeps the housing and engine air intake warm, decreasing engine wet stacking. When the fan is running, air flows into the housing and air flows through the radiator. Hot air may exit the housing behind the radiator through a sound-attenuating duct. This air, as well as the air from the radiator, exits the housing in an upward direction. In one nonlimiting example, approximately 30% of the total air flow is provided in one airflow to cool the generator and engine compartment, and approximately 70% flows in another airflow through the radiator.

The cooling system controls the fan speed using several different inputs depending on the generator set system. Input temperature parameters include coolant top tank temperature, charge air cooler (CAC) air temperature, and fuel return temperature. The controller uses proportional control to maintain the temperature of each input to the specified temperature range. In one example, the top tank temperature range is (95 C to 100 C). At temperature below 95 C the fan does not run. As top tank temperature raises from 95 C to 100 C the speed of the fan increases with top tank temperature. At a top tank temperature above 100 C, the fan runs at 100% of rated speed. Under most steady state operating conditions, the cooling system operates at a near steady state condition within the prescribed range (95 C to 100 C). Because the system is closed loop around the top tank temperature (or CAC or fuel temperature) the system will automatically correct for a clogged radiator or other performance degradation. A coolant high-temperature logic control may be implemented to provide automatic shutdown in the event that coolant temperature exceeds 225±5° F. (107±3° C.). The aforementioned example is meant only as an illustration and is not meant to be limiting.

Water intrusion during operation in rainy conditions can be a serious problem for generator set housing designs because most generator set housing designs bring the radiator cooling air through the housing. The result is high air velocity throughout the housing with significant amounts of rain droplets carried on the air stream. This ingested water can cause corrosion as well as potential shorting of electrical components. While no housing design will completely eliminate rain intrusion because very small droplets will float on extremely low air velocities, rain intrusion can be reduced with various embodiments of the present application so it is not as problematic. In one embodiment, the unique air flow design minimizes rain and dust intrusion into the second compartment in several ways. Separate air flow paths, each path containing only part of the total air volume, results in lower velocities through the second compartment. The lower velocities through the second compartment result in reduced air velocity and reduced rain water carry over. Furthermore, low air velocities in the inlet ducts (resulting from large size ducts and low airflow volume through the housing) allow rain carried by the air to drop out before entering the housing. Additionally, fan placement at the entrance to the housing results in positive pressure in the housing instead of negative pressure. Positive pressure is generally desirable because it helps keep rain from entering holes and cracks in the housing, which is a significant source of water intrusion in most genset housings.

Furthermore, ice, freezing rain, and hoarfrost can cause numerous problems for a genset. Air intakes can become blocked with ice, limiting airflow, and moving parts such as louvers or exhaust caps can become stuck and freezing water inside the generator set can cause damage to components. The design of airflow paths eliminates the ingestion of significant amounts of water into the generator set housing. The variable speed electric fans run only very slowly during cool ambient temperature operation, even at full load.

One nonlimiting embodiment of the present application includes genset equipment capable of providing a 30 kiloWatt (kW) VAC output. The genset is suitable for deployment in the battlefield to provide a soldier with the continuous power generation necessary for today's fielded electronic devices and various electrical equipment demands. It is developed to be fixed (skid mounted) or mobile (trailer mounted) giving the flexibility of movement.

The genset includes an aluminum housing with several individual body panels to enclose the engine, generator and other internal components. This housing provides protection from the environment and provides acoustical protection, but also provides for ready entry access to generator set assemblies. The housing is compartmentalized with appropriate passages/apertures interconnecting the various compartments to provide for air cooling flow over selected generator set components, such as a radiator to cool the engine, the power generator, the fueling block, various electronics, and the engine itself. The housing configuration further protects against the invasion of wind-driven rain, snow, and sand to the interior compartments containing genset equipment that may be sensitive to the same. The design and placement of a louver and a rain cap provide further protection. Self-supporting hinged doors provide interior access for scheduled service and preventive maintenance. Individual body panels are removable to allow additional access for replacement and service of major components.

In one form, the genset engine is a Cummins QSB 4.5 Tier III engine. The vertical, water-cooled, four-cycle Direct Injection (DI) diesel engine utilizes a four-cylinder, turbo-charged process that includes a cylinder head and valve cover, crankcase assembly, pistons, main bearing case, and lubrication system. This particular engine has a built-in Close Crankcase Ventilation (CCV) system. The engine produces mechanical energy and interconnects with the AC generator via a rotating shaft.

A cooling system for the genset includes three cooling fans which allow the generator set to operate in all required operational environments. The 16-in., variable-speed 24-VDC cooling fans provide for a better radiator location and improved cooling efficiency. Intake air for the cooling system is drawn by the cooling fans through a grille on the left-side body panel. This air passes through the cooling fins of the radiator, charge air cooler, and fuel cooler, transferring heat from the cooling system to the air flow. The warm air is then expelled into the atmosphere through a grille in the top panel. The cooling system also reduces wear on the battery-charging alternator belt and water pump. Cold weather operation is also improved by regulating cabinet temperature at or near ideal operating temperatures of 195 degrees Fahrenheit (° F.) (90.5 degrees Celsius (° C.)).

The radiator acts as a heat exchanger for the engine coolant. A radiator fill port is accessible on the top body panel. The captive radiator cap prevents loss of coolant. The charge air cooler dissipates the heat from the compressed air exiting the turbocharger into the air flow. The cooling of the intake air improves the efficiency of the engine. A thermostat is located inside the housing where the upper radiator connects to the top of the engine. It monitors coolant temperature and adjusts the cooling system accordingly. The water pump circulates the coolant through the block and the radiator. The exhaust gases exit the turbocharger and through the muffler.

The AC generator converts the rotating mechanical energy from the engine into electrical energy. The electrical energy is then distributed from the output box assembly through cables that enter the output box assembly. In certain implementations, the AC generator is a Cummins Power Generation CPG UC224D (Mode I, Model 1070 (50/60 Hz)) or a Marathon 30 kW (Mode II, Model 1071 (400 Hz)). The AC generator has a synchronous, brushless design with a permanent magnet and was developed specifically to meet performance requirements. The AC generator receives mechanical energy from the engine and converts it to electrical energy.

The embodiment a genset with a 30 kW rating under the (AMMPS) program of the U.S. Department of Defense. Under this program various implementations provide nominal AC output frequencies selectable between 50 and 60 Hertz (Hz), while others provide a nominal AC output frequency of 400 Hz; and may be configured to provide nominal output voltages selectable between 120 and 240 VAC nominal, while others include 416 VAC nominal. Nonetheless, still other embodiments may be configured to provide different output voltage(s), frequencies, and maximum peak, sustained, or rated output power levels, in addition to or in lieu of those explicitly described. For instance, such other embodiments can have power ratings of 5 kW, 10 kW, 15 kW, and 60 kW—to name just a few examples. Furthermore, while some of the genset configurations described herein include features to accommodate certain military battlefield conditions, extreme cold starting, and the like; in other embodiments some or all of such features may be absent and/or any of such features may be directed/desired for nonmilitary applications, those with other environmental considerations, or the like. Indeed, only one of the various described genset features or aspects may be included in other embodiments, and/or only one of many of the inventive features described herein may be the subject of a given invention written description or claim.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. An apparatus, comprising:
   an engine, in fluid connection with a radiator, mechanically coupled to a generator to provide mechanical power thereto;
   a housing assembly defining an interior space with a first compartment housing the radiator and a second compartment housing the engine and the generator, the housing assembly defining a first airflow path through the first compartment and a second airflow path that extends from the first compartment and through the second compartment;
   a temperature sensor disposed within the housing;
   a variable speed fan in the first compartment that is operable to generate airflow through the first airflow path to provide cooling of the radiator and from the first airflow path through the second airflow path to provide cooling of at least one of the engine and the generator; and
   a controller in communication with the variable speed fan and the temperature sensor.

2. The apparatus of claim 1, wherein the first compartment further comprises a first outlet to discharge heated cooling airflow from the radiator away from the housing assembly and the second compartment further includes a second outlet to discharge heated cooling airflow away from the housing assembly.

3. The apparatus of claim 1, wherein the variable speed fan is electrically powered.

4. The apparatus of claim 1, wherein the engine is a diesel engine.

5. The apparatus of claim 1, wherein the temperature sensor is operably structured to determine at least one of a coolant top tank temperature, a charge air cooler air temperature, and a fuel return temperature.

6. The apparatus of claim 1, wherein the temperature sensor, the variable speed fan, and the controller form a closed loop feedback system.

7. The apparatus of claim 1, further comprising a fan disposed within the housing assembly structured to recirculate air within the second compartment of the housing assembly.

8. A system, comprising:
   an engine in fluid communication with a radiator, the engine being operably connected to a generator;
   a housing assembly defining an interior space with a first compartment housing the radiator and a second compartment housing the engine and the generator, wherein the first compartment and second compartment are connected by an aperture;

a variable speed fan mounted in the first compartment, wherein the variable speed fan is operable to generate a first airflow through the first compartment to a first outlet defined by the housing assembly for outletting the first airflow after passing over the radiator, wherein the variable speed fan is further operable to generate a second airflow from the first compartment through the aperture and through the second compartment to a second outlet defined by the housing assembly after passing the second airflow over at least one of the generator and the engine;

means for determining a temperature parameter; and means for altering the flow rate of at least one of the first and the second airflow to meet a target temperature.

9. The system of claim 8, further comprising a second fan in the second compartment for generating airflow in the second compartment.

10. The system of claim 8, wherein the housing assembly further comprises means for reducing at least one of acoustic signature and electromagnetic interference.

11. The system of claim 8, further comprising means for powering down the engine should a coolant temperature exceed a maximum coolant temperature parameter.

12. The system of claim 8, wherein the engine is a diesel engine.

13. A method, comprising:

providing a generator operably connected to an internal combustion engine having a radiator, the radiator being enclosed in a first compartment of a housing assembly and the generator and engine being at least partially enclosed within a second compartment of the housing assembly;

generating a flow of cooling air into the first compartment of the housing assembly with a variable speed fan located within the first compartment;

flowing a first portion of the flow of cooling air from the variable speed fan along a first flow path defined by the housing assembly in the first compartment to cool the radiator;

flowing a second portion of the flow of cooling air from the variable speed fan from the first compartment through an opening defined by the housing assembly and into the second compartment along a second flow path defined by the housing assembly in the second compartment to cool at least one of the generator and the engine;

in response to flowing the first and second portion of cooling air, exhausting the air from the housing assembly once it has been used for cooling;

determining a temperature parameter; and in response to determining the temperature parameter, altering the flow rate of the cooling air to meet a target parameter.

14. The method of claim 13, further comprising recirculating air inside the second compartment of the housing assembly via an alternator fan.

15. The method of claim 13, wherein altering the flow rate of the cooling air comprises altering the speed of the variable speed fan at an inlet to the first compartment.

16. The method of claim 13, further comprising attenuating sound from the air which has been exhausted from the housing assembly.

17. The method of claim 13, further comprising maintaining a constant flow rate in response to meeting the target parameter.

18. The method of claim 13, further comprising increase wet stacking performance by providing a warm engine air intake temperature at light generator loads and a cool engine air intake temperature at high generator loads.

19. The method of claim 13, wherein determining the temperature parameter further comprises determining at least one of a coolant top tank temperature, a charge air cooler air temperature, and a fuel return temperature.

20. The method of claim 13, wherein receiving cooling air into the housing assembly occurs in response to determining that at least one of the engine and the generator have reached a target operational temperature.

21. An apparatus, comprising:

an engine operably coupled to a generator, the engine dedicated to the production of electricity by the generator;

a radiator in fluid communication with the engine;

a housing assembly defining a first compartment enclosing the radiator and a second compartment at least partially enclosing the engine and generator, wherein the first compartment is in fluid communication with the second compartment through an aperture of the housing assembly; and a variable speed cooling fan at an inlet to the first compartment that is in flow communication with the radiator and with at least one of the engine and the generator through the aperture, the speed of the variable speed cooling fan being controlled by a controller.

22. The apparatus of claim 21, wherein the variable speed cooling fan is in electronic communication with one of a power supply, a battery, or generator power output.

23. The apparatus of claim 21, further comprising a temperature sensor disposed within the housing assembly, the temperature sensor structured to provide feedback to the controller, the controller being structured to receive the feedback and vary the speed of the fan in response to the feedback to reach a target parameter.

24. The apparatus of claim 22, wherein the housing assembly defines a first airflow path structured to provide cooling to the radiator and a second airflow path structured to provide cooling to at least one of the engine and the generator.

25. The apparatus of claim 21, further comprising a second fan in the second compartment that is operable to provide a cooling airflow to the generator when the variable speed cooling fan is not providing an airflow.

26. A method, comprising:

dedicating an engine to the production of electricity by a generator, the engine being operably coupled to the generator, the engine further being connected to a radiator, positioning the radiator in a first compartment of a housing assembly with a variable speed fan, disposed within the first compartment, and positioning the engine and the generator in a second compartment of the housing assembly at least partially enclosing the engine and the generator;

determining a temperature parameter; and in response to determining the temperature parameter, altering a fan speed of the variable speed fan in the first compartment to meet a target parameter, the variable speed fan being in flow communication with ambient temperature air at an inlet to the first compartment and in flow communication with the second compartment through an aperture defined by the housing assembly between the first compartment and the second compartment.

27. The method of 26, further comprising altering a plurality of fan speeds, in response to determining the temperature parameter, to meet at least one target parameter, the plurality of fans being in flow communication with an air inlet and in flow communication with the second compartment.

28. The method of 26, further comprising disposing the variable speed fan within the first compartment of the housing assembly.

29. The method of 26, wherein determining the temperature parameter further comprises determining at least one of a coolant top tank temperature, a charge air cooler air temperature, and a fuel return temperature.

* * * * *